United States Patent [19]

Totman

[11] 4,294,275

[45] Oct. 13, 1981

[54] FLANGED JOINT SEALING NUT

[75] Inventor: Mirrel L. Totman, McPherson, Kans.

[73] Assignee: Totman Seal Nut, Inc., McPherson, Kans.

[21] Appl. No.: 29,679

[22] Filed: Apr. 13, 1979

[51] Int. Cl.³ .................... F16L 55/18; F17D 3/00
[52] U.S. Cl. .................................. 137/15; 285/15; 285/368; 285/382; 29/401.1
[58] Field of Search .......... 29/402.02, 402.16, 401 R; 285/15, 368, 382, 280; 137/15; 251/334, 333

[56] References Cited

U.S. PATENT DOCUMENTS

| | | | |
|---|---|---|---|
| 3,136,220 | 6/1964 | Kamm | 251/334 X |
| 3,912,307 | 10/1975 | Totman | 285/382 |
| 3,924,649 | 12/1975 | Totman | 137/15 |

*Primary Examiner*—Alan Cohan
*Attorney, Agent, or Firm*—Edward L. Brown, Sr.

[57] ABSTRACT

The nut is for repairing leaking bolt holes in flanged pipe joints by means of a closed-end nut having a sharp circular projection on its open end. When this sealing nut is substituted for existing nuts on bolts in the flanged joint and tightened, the nut, which is hardened, cuts a circular groove in the face of the flange that makes a metal-to-metal seal to close leaks at bolt holes. The bolts may be same diameter as the existing bolts and may be installed one at a time to accomplish the repair without reducing pressure in the pipe. Leakage from between the flanges at their perimeter is closed off by sealing in a conventional manner by welding a band around the perimeter of the flanges before the bolt hole sealing is started.

4 Claims, 3 Drawing Figures

FLANGED JOINT SEALING NUT

BACKGROUND OF THE INVENTION

The sealing nut is for use in expediting repair of leaking flanged pipe joints while pipe is in service and under pressure. It is a closed end nut having a circular rib, concentric with thread and vee-shaped in cross section, projecting from the open end of the nut.

Prior art is described in U.S. Pat. Nos. 3,912,307 and 3,924,649 which were issued to the inventor named in this application. The sealing nut described in his patents has a hardened, beveled, projecting portion on its open end which projection is partially receivable in a bolt hole and which causes the rim of the bolt hole to deform when the sealing nut is tightened. The rim of the bolt hole sometimes has a notch which is too deep to be closed by the deformation of the rim by the projecting beveled portion. The improved sealing nut moves the sealing area out away from the rim. Another problem of the earlier sealing nut is that it is limited to a bolt and nut smaller in diameter than the original so that the beveled portion of the sealing nut can partially enter the bolt hole. The improved sealing nut is not subject to this size limitation.

SUMMARY OF THE INVENTION

The invention is an improvement on a sealing nut and a method of flanged joint sealing while a leaking pipe joint remains in service under pressure, which are described in U.S. Pat. Nos. 3,912,307 and 3,924,649. These two patents were issued to the present inventor. They disclose a sealing nut and method for more conveniently sealing leaking bolts and nuts, one at a time, after the well-known step of welding a band around the outside of the pipe flanges.

In the present invention, the seal between nut and flange has been moved to the face of the flange away from the periphery of the bolt hole rim. The aforementioned earlier nut and method of sealing has the seal on the bolt hole rim which causes a problem when the rim has a notch which is too deep to be ironed out by tightening the sealing nut. In the present invention, the projection on the open end of the nut is near the outside of the nut instead of being adjacent to the threads of the nut. This causes the seal between the sealing nut and the flange to be formed on the face of the flange. The face is machined flat when manufactured to provide a flat bearing surface for nuts and therefore is a good surface for forming a seal. It is unlikely that a deep notch or groove would be found on a flange face away from the bolt hole rim. It is even less likely that notches or grooves would be found at both the rim of the bolt hole and away from the rim at the same bolt hole. Therefore if the one type of sealing nut cannot make the seal, the other type can in almost every instance.

Another feature of the improved sealing nut is that it permits the repair to be made with the same diameter bolt and nut that was originally used. The earlier sealing nut requires a smaller diameter bolt and nut in order to provide an annular space to permit the projection on the sealing nut to partially enter the bolt hole. The improved nut permits restoration of original bolt strength of the joint.

It is an object of this invention to provide an improved sealing nut and an improved method for installing the nut for sealing a leak in a flanged pipe joint while it remains under pressure even though the bolt hole rim has a notch too deep to seal with the earlier type sealing nut.

It is another object of this invention to provide an improved sealing nut and an improved method for installing the nut for sealing a leak in a flanged pipe joint while it remains under pressure while using a bolt and nut equal in diameter to the original bolt and nut in order to restore the original bolt strength to the flanged pipe joint.

It is another object of this invention to improve the method for flanged joint sealing over the prior art by using a bolt and two sealing nuts of the same diameter as the original bolt with the projections on the open end of the sealing nuts being near the outside of the nuts and having a sharp leading edge to form a groove in the flange face which provides a metal-to-metal seal between the projection on each nut and the face of the corresponding flange while the two nuts are being alternately tightened.

BRIEF DESCRIPTION OF THE DRAWING

In the drawing, which aids in the understanding of the invention.

DETAILED DESCRIPTION OF THE PREFERRED EMBODIMENT

Figure 1:
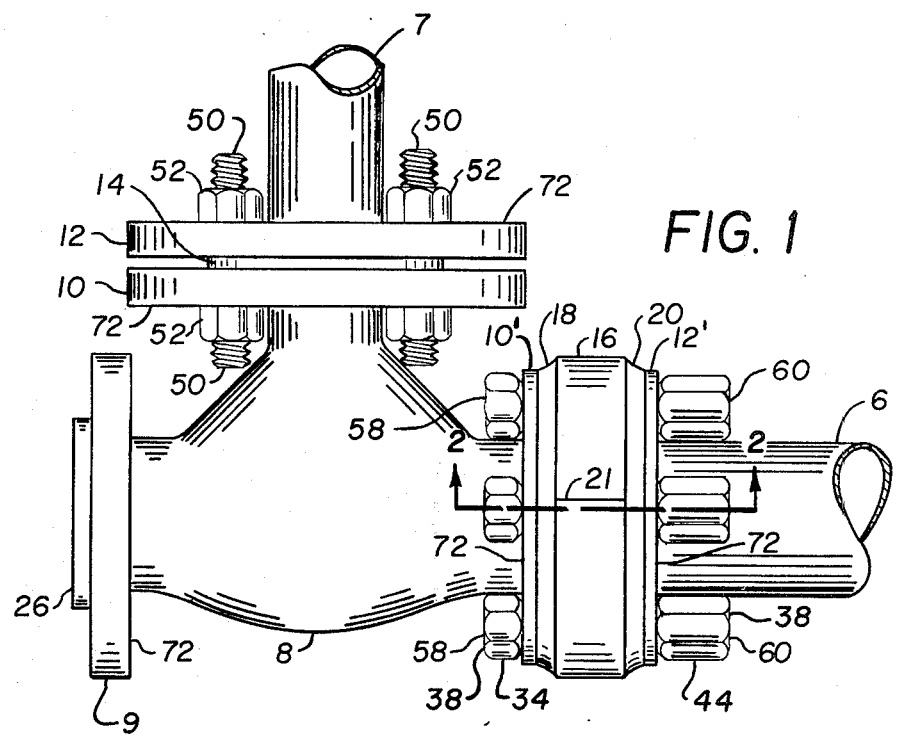
FIG. 1 is an elevational view showing a pipe fitting with a conventional flanged joint in its original state and another flanged joint after being repaired using the invention.

The specification contains a written description of the invention, and of the manner and process of making and using it in sufficiently full, clear, concise, and exact terms as to enable any person skilled in the art to which it pertains, to make and use the same. The specification sets forth the best mode contemplated by the inventor for carrying out his invention. The drawing facilitates the understanding of the detailed description.

Figure 2:
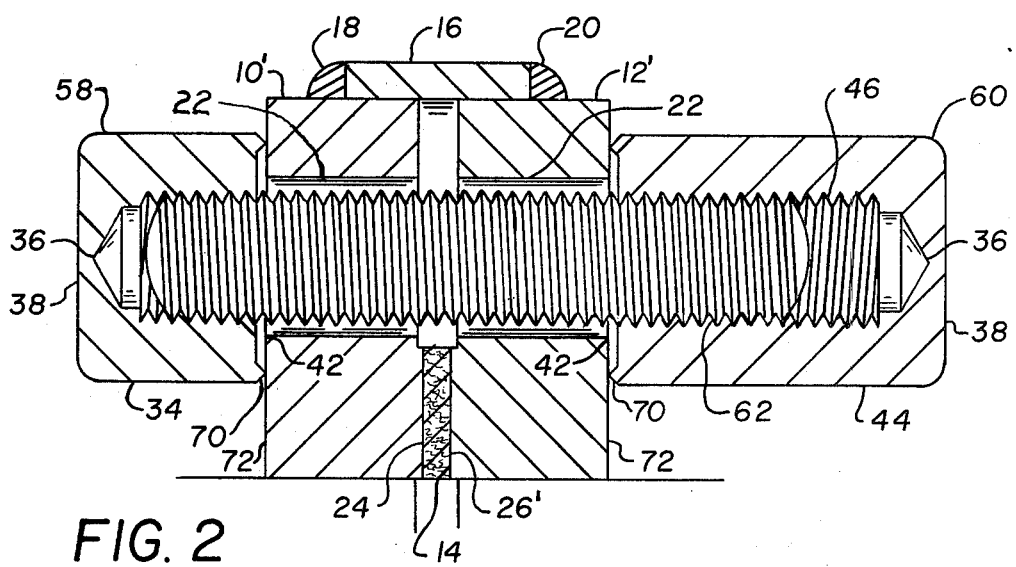
FIG. 2 is a cross sectional view along the line 2—2 of FIG. 1 showing the elements of the invention and a portion of the flanged joint being repaired.
Figure 3:
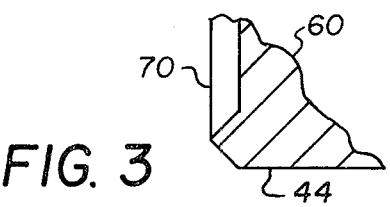
FIG. 3 is an enlarged view of a portion of FIG. 2 showing, in section, the projection on the open end of the seal nut more clearly.

Referring first to FIG. 1, a tee-pipe fitting 8 is shown having a flange 10 which is connected to a flange 12 on a pipe 7 by a plurality of conventional bolts 50 and nuts 52 in a conventional manner before any repair. While a tee is shown, this invention may be used to repair any leaking flanged joint in piping and valves. The tee 8 also has a flange 9 and a flange 10'. The open flange 9 and seat 26 are shown for information only and have no involvement with the other flanges. In actual use, where a leak is being repaired on a line under pressure, there would be a flange bolted to the flange 9. The flange 10' is connected to a flange 12' on a pipe 6. These two flanges, 10' and 12', illustrate a leaking flanged pipe joint which has been repaired using a plurality of sealing nuts 58 and 60 of the present invention. A plurality of bolts 62 are not visible in FIG. 1 but are shown in FIG. 2 passing through bolt holes 22 in the flanges 10' and 12'. Seat 24 on the flange 10' and seat 26' on the flange 12' hold a gasket 14 confined therebetween in sealing relation. Returning to FIG. 1; a band 16 is shown encircling the flanges 10' and 12' and welded to them by a pair of fillet welds 18 and 20 respectively. The band 16 is usually applied in two semi-circular sections to facilitate its application and after the two sections are in place they are joined by a pair of butt welds 21 across the band 16.

Now referring to FIG. 2, the difference between the sealing nuts 58 and 60 will be described. The regular sealing nut 58 has a threaded length somewhat longer than a standard nut due to the end of a recess 36, formed in the nut blank before threading, and the material needed to form a closed end 38. In deep sealing nut 60 an additional thread length 46 causes the nut 60 to be thicker than the regular sealing nut 58. All nuts require sufficient thread length to develop the potential tensile strength of the bolt. Because of the closed end 38 on the sealing nuts 58 and 60, the length of the bolt 62 is critical and the deep sealing nut 60 provides room for a practical length tolerance in the bolt 62. Some locations do not provide room for the deep sealing nut 60, such as the uppermost nut 58 shown in FIG. 1, and therefore both the sealing nuts 58 and 60 are needed. Both the nuts 58 and 60 have the closed end 38 and a projection 70 located near the perimeter of the open end of the nut. The projection 70 is a concentric circular rib, vee-shaped in cross section, sharp and hardened, to enable it to form a groove in the face 72 of the flanges 10' and 12'. As the nut is rotated, the projections and groove thus effect a seal against pressurized fluids leaking from the interior of the joint past the gasket 14.

In the sealing nut described in U.S. Pat. No. 3,912,307, an undersized bolt is used to allow room in the annular space between the bolt and the bolt hole for a bevelled projection on the earlier sealing nut to bear against a rim 42 and form a seal between the bevelled projection and the rim 42. Occasionally a notch is found on the rim 42, and if it is deep enough it cannot be ironed out by turning the earlier type sealing nut. However, the face 72 of the flanges 10' and 12' provides a good plate to cut or form a sealing groove with the new sealing nuts 58 and 60 because the face 72 has been machined flat when manufactured. An outer side 34 of the regular seal nut 58 and an outer side 44 of the deep seal nut 60 are hexagon shaped to fit conventional wrenches used on the original nuts 52.

In operation, when a pipe flange gasket, like gasket 14, is leaking and it is not practical to shut down the line and disassemble the joint for repair, it has been conventional practice to weld a band like the band 16 to the outside of flanges 10 and 12, then weld around each nut, like the nuts 52, with two fillet welds, one sealing between nut and flange and one sealing between nut and bolt. This is time consuming and the sealing nuts described in U.S. Pat. No. 3,912,307 eliminated this tedious and difficult welding operation. The present invention permits the bolts 62 used in the repair, to be full size diameter, since there is no need for the bevelled projection of the earlier sealing nut to partially enter the bolt hole. The projections 70 of the sealing nuts can bear on a flat surface on the face 72 of the flanges, free of the problem of notches in the bolt hole rim 42 which sometimes prevent the earlier U.S. Pat. No. 3,912,307 sealing nut from sealing off the leak. To install the improved sealing nuts 58 and 60 after welding the band 16 to the flanges 10' and 12', one of the original bolts, like the bolt 50, is removed by removing one or both of the original nuts, like the nut 52. Using a bolt 62 of the same diameter as the original bolt 50, it is inserted through the bolt holes 22 and threaded into the regular seal nut 58 until the bolt 62 is engaged sufficiently to develop the tensile strength of the bolt 62. Then the deep sealing nut 60 is threaded onto the other end of the bolt 62 until the projections 70 of both nuts 58 and 60 have been brought into contact with the faces 72 of their adjoining flanges 10' and 12' respectively. After bringing both the projections 70 into contact with the faces 72, the sealing nuts 58 and 60 are alternately tightened, approximately one-quarter of a turn at a time, until fully tightened. This alternate tightening is a method to obtain a rotation under pressure action of the projection 70 on the face 72, which action forms the sealing groove. Another method would be to tighten the nuts 58 and 60 simultaneously. After the first bolt 50 has been replaced with the bolt 62 and tightened, the others are replaced one at a time.

In most flanged pipe joints in high pressure pipe lines, the flanges 10' and 12' are steel as well as are the bolts 62. The sealing nuts 58 and 60 are made of cold rolled, hardenable, hexagonal steel bars. They are made on a turret lathe or on an automatic screw machine depending on the quantities required. If much larger quantities were required, the nut blank might be performed by a forging process and then threaded. It has been found practicable to harden and temper the entire nut 58 and 60 rather than just the projection 70. In special instances, non-ferrous metal or plastic bolts 62 and sealing nuts 58 and 60 may be desirable.

Having disclosed the best known mode of this invention fully and clearly as to enable any person skilled in the art to make and use these sealing nuts,

I claim:

1. An improved bolt-hole sealing nut, for replacing a leaking nut at a bolt hole in a flanged pipe joint, comprising a closed-end nut having on its open end a concentric and hardened projection that, as the sealing nut is tightened, on a bolt, against the flange, the projection reshapes a portion of the flange to form a tight, lasting, and positive seal between the projection on the nut and the flange, wherein the improvement comprises:

the sealing nut which along with its bolt is full size diameter, equal to replaced original nut and bolt, permitting restoration of original bolt strength, and has a circular rib, triangular in section, projecting from the open end of the sealing nut toward face of the flange but located near perimeter of the sealing nut and clear of rim of the bolt hole so that as the sealing nut is tightened on the bolt, the rib forms a groove in the face of the flange to form a tight seal thus sealing off the leaking nut.

2. An improved bolt-hole sealing nut as described in claim 1 in which the sealing nut on one end of each bolt is thicker than a standard unit and has a deeper threaded recess to provide for a practical tolerance in length of the bolt.

3. An improved bolt-hole sealing nut as described in claim 1 in which the sealing nut is made of hardenable steel.

4. An improved method of sealing a leaking flanged pipe joint comprising the steps of:

sealing the outer circumferential gap between the two adjacent flanges of the joint;

replacing the original bolts and nuts, one at a time, with a bolt and two closed-end nuts, the nuts having a means for sealing between the nuts and the flanges; and threading the sealing nuts onto the bolt until both nuts contact the flanges, then tightening each nut until fully tightened, thus lastingly and positively sealing each nut to its adjacent flange;

in which the improvement comprises:

using full size sealing nuts and bolts equal in diameter to the original nuts and bolts, and locating the sealing area on the face of the flange near perimeter of the nut and away from rim of bolt hole.

* * * * *